United States Patent
Jakob et al.

(10) Patent No.: US 7,241,433 B2
(45) Date of Patent: Jul. 10, 2007

(54) PROCESS FOR THE PREPARATION OF COATED GRANULAR SODIUM PERCARBONATE, AND PRODUCT OBTAINABLE BY THE PROCESS

(75) Inventors: Harald Jakob, Hasselroth (DE); Waldemar Hessberger, Alzenau (DE); Juergen Lattich, Nidderau (DE); Ralph Overdick, Hofheim (DE)

(73) Assignee: Degussa GmbH, Düsseldorf (DE)

( * ) Notice: Subject to any disclaimer, the term of this patent is extended or adjusted under 35 U.S.C. 154(b) by 417 days.

(21) Appl. No.: 10/223,351

(22) Filed: Aug. 20, 2002

(65) Prior Publication Data
US 2003/0104967 A1    Jun. 5, 2003

(30) Foreign Application Priority Data
Aug. 21, 2001  (DE) ................. 101 40 838

(51) Int. Cl.
C01B 15/10 (2006.01)
B05D 1/02 (2006.01)
B05D 3/00 (2006.01)
B05D 3/02 (2006.01)
C11D 17/00 (2006.01)

(52) U.S. Cl. ............... 423/415.2; 423/415.1; 423/421; 423/275; 252/186.27; 252/186.32; 510/444; 510/446; 510/456; 427/213; 427/215; 427/314

(58) Field of Classification Search ........... 423/421
See application file for complete search history.

(56) References Cited

U.S. PATENT DOCUMENTS

| | | | | |
|---|---|---|---|---|
| 3,917,663 A | * | 11/1975 | Kegelart et al. ........ | 423/415.2 |
| 4,428,914 A | * | 1/1984 | Brichard et al. ........ | 423/265 |
| 5,294,427 A | * | 3/1994 | Sasaki et al. ........... | 423/415.2 |
| 5,560,896 A | * | 10/1996 | Bewersdorf et al. ..... | 423/415.2 |
| 5,714,201 A | * | 2/1998 | Bewersdorf et al. ..... | 427/213 |
| 5,851,420 A | | 12/1998 | Kim et al. | |
| 5,935,708 A | * | 8/1999 | Schuette et al. ....... | 428/403 |
| 6,113,805 A | * | 9/2000 | Schutte et al. ........ | 252/186.2 |
| 6,231,828 B1 | * | 5/2001 | James et al. .......... | 423/415.2 |
| 6,482,385 B2 | * | 11/2002 | James et al. .......... | 423/415.2 |
| 2002/0041843 A1 | | 4/2002 | Jakob et al. | |
| 2002/0086807 A1 | * | 7/2002 | Lee et al. ............ | 510/309 |
| 2002/0127168 A1 | | 9/2002 | Jakob et al. | |
| 2003/0104967 A1 | * | 6/2003 | Jakob et al. ........... | 510/444 |

FOREIGN PATENT DOCUMENTS

| | | |
|---|---|---|
| DE | 27 33 935 A1 | 2/1978 |
| DE | 100 48 514 A1 | 4/2002 |
| EP | 0 962 424 | 12/1999 |
| EP | 0 970 917 | 1/2000 |
| WO | WO 95/06615 | 5/1995 |
| WO | WO 97/19890 | 6/1997 |
| WO | WO 99/06321 | 9/1999 |

* cited by examiner

*Primary Examiner*—Joseph D. Anthony
(74) *Attorney, Agent, or Firm*—Oblon, Spivak, McClelland, Maier & Neustadt, P.C.

(57) ABSTRACT

The invention relates to a process for the preparation of coated granular sodium percarbonate having a low TAM value. The preparation is carried out by fluidized-bed spray granulation at a temperature $T_G$ in the range from 45 to 75° C., and the coating is effected by the spray application of an aqueous solution containing at least one coating component in a fluidized bed at a temperature $T_U$ in the range from 35 to 100° C. According to the invention, a) after the fluidized-bed spray granulation but before the coating, drying is carried out at $T_{NT}$ of greater than $T_G$, or b) the fluidized-bed granulation is carried out in at least two steps at $T_{G1}$, $T_{G2}$ ... $T_{Gn}$, $T_{G2}$ or $T_{Gn}$ being higher than $T_G1$, and drying being unnecessary if ⅔ of the granulate have been formed at $T_G1$, or c) drying takes place not after the granulation but after the coating, at $T_{UNT}$, $T_{UNT}$ being at least 20° C. higher than $T_G$.

24 Claims, No Drawings

PROCESS FOR THE PREPARATION OF COATED GRANULAR SODIUM PERCARBONATE, AND PRODUCT OBTAINABLE BY THE PROCESS

BACKGROUND OF THE INVENTION

1. Field of the Invention

The invention relates to a process for the preparation of coated granular sodium percarbonate having a low TAM value, and to a product obtainable by the process, which product is distinguished by a low TAM value (microcalorimetric determination of the release of energy during storage). The process according to the invention comprises (i) the preparation of granular sodium percarbonate by fluidized-bed spray granulation, and (ii) coating of the granular sodium percarbonate with a coating component in a fluidized bed.

2. Discussion of the Background

For the preparation of sodium percarbonate of the general formula $2\ Na_2CO_3 \cdot 3H_2O_2$, which is used as a bleaching component in washing and cleaning agents, crystallization processes and fluidized-bed spray granulation processes in particular are used on an industrial scale.

Although sodium percarbonate obtained by crystallization processes can readily be stored owing to its often low TAM value per se, the active oxygen stability in the presence of washing agent constituents, such as, especially, zeolites, is unsatisfactory because of the porous surface. Although the stability of sodium percarbonate produced by a crystallization process to storage in the presence of washing agent constituents can be improved by coating the sodium percarbonate core with components having a stabilizing action, the demands nowadays made of such a product are often no longer adequately met.

Fluidized-bed spray granulation processes yield substantially spherical, dense sodium percarbonate particles which have a shell-like structure, resulting from the preparation, and higher storage stability than a product obtained by crystallization. In order to carry out the process, an aqueous hydrogen peroxide solution and an aqueous soda solution or, optionally, soda suspension are sprayed into a fluidized-bed containing sodium percarbonate particles whose diameter is smaller than that of the particles to be prepared. During the spraying in of the reactants, which are in an aqueous medium, water is evaporated off at a fluidized-bed temperature in the range from 40 to 95° C. Details regarding the implementation of the fluidized-bed spray granulation process are to be found, for example, in EP patent 0 716 640. In order further to increase the active oxygen stability in the presence of washing agent constituents, sodium percarbonate produced by fluidized-bed spray granulation can also be coated with a stabilizing coating layer, for example with a sodium sulfate layer according to EP patent 0 863 842.

For reasons of safety when handling sodium percarbonate, especially increased safety during storage in a silo, there is an increased demand for sodium percarbonate having further improved storage stability, corresponding to a further reduced TAM value as compared with hitherto. Although the TAM value of sodium percarbonate can be lowered to a certain extent by coating the sodium percarbonate with an inactivating material, the effect that can be achieved thereby is in many cases still inadequate. The TAM value is a microcalorimetric determination of the release of energy during storage, determined by means of a TAM® Thermal Activity Monitor from Termometric AB, Järfälla (SE).

Various attempts have already been made to lower the TAM value of sodium percarbonate in the case of preparation by fluidized-bed spray granulation. As the inventors of the present Application have found, a sodium percarbonate prepared according to DE-OS 27 33 935, which was produced by fluidized-bed spray granulation, has a relatively low TAM value if both a condensed phosphate and magnesium sulfate are added to the solutions for spraying. A disadvantage of that process is the large amount of those added substances that is required.

DE patent application 100 48 514.6, which has not yet been published, teaches a further process for the preparation of sodium percarbonate having a low TAM value, preferably less than 6 µW/g, by fluidized-bed spray granulation, in which process, for the purpose of lowering the TAM value, there is preferably added to at least one of the solutions for spraying a magnesium compound in an amount of approximately from 100 to 1000 ppm $Mg^{2+}$ and/or a selected chelating agent, such as an aminophosphonic acid, in an amount of from 200 to 1000 ppm. As already mentioned at the beginning, a sodium percarbonate having a low TAM value must generally also be covered with a stabilizing coating in order to ensure adequate storage stability of the active oxgyen content in washing and cleaning agents. While the TAM value is a criterion for safety during storage in a silo, the active oxygen stability is a criterion that is of importance especially for the storage of a washing agent containing sodium percarbonate.

Accordingly, the object of the present invention is to provide a process for the preparation of coated granular sodium percarbonate having a low TAM value, especially a TAM value of less than 8 µW/g, preferably less than 5 µW/g. The process should be as simple as possible to implement industrially. Preferably, no process steps should be required other than those already used in the case of known fluidized-bed spray granulation and coating in a fluidized bed.

SUMMARY OF THE INVENTION

These and other objects, which will become apparent from the further description, are achieved by the process according to the invention. Accordingly, there has been found a process for the preparation of coated granular sodium percarbonate, comprising (i) preparation of granular sodium percarbonate by fluidized-bed spray granulation, wherein an aqueous sodium carbonate solution or suspension and an aqueous hydrogen peroxide solution are sprayed in a molar ratio of $Na_2CO_3$ to $H_2O_2$ in the range from 1:1.4 to 1:1.8 into a fluidized bed containing sodium percarbonate particles, and water is simultaneously evaporated off, and (ii) coating of the granular sodium percarbonate by the spray application, in a fluidized bed, of at least one aqueous solution containing one or more coating components, with the simultaneous evaporation of water, which process is characterised in that a) the fluidized-bed spray granulation is carried out at a fluidized-bed temperature $T_G$ in the range from 45 to 75° C., the granular sodium percarbonate is dried, before it is coated, at a fluidized-bed temperature $T_{NT}$ in the range from 60 to 100° C., $T_{NT}$ being higher than $T_G$, and the coating is carried out at a fluidized-bed temperature $T_U$ in the range from 35 to 100° C., or in that b) the fluidized-bed spray granulation is carried out in at least two steps, the fluidized-bed temperature $T_{G1}$ being in the mentioned range for $T_G$ and the fluidized-bed temperature $T_{Gn}$ in the subsequent step(s) being in the range for $T_{GNT}$, $T_{GNT}$ being higher than $T_G$, and at least two thirds of the mass of the granulate having been formed during the first step, and the sodium percarbonate granulate so obtained is coated, without or after being dried, at a fluidized-bed temperature in the range of $T_U$, or in that (c) the granular sodium percarbonate prepared at $T_G$ without being dried is coated and dried at a fluidized-bed temperature $T_{UNT}$, $T_{UNT}$ being at least 20° C. higher than $T_G$.

The sub-claims are directed towards preferred embodiments of the process according to the invention.

The invention relates also to coated granular sodium percarbonate which has a $Mg^{+2}$ content in the core of from 100 to 1000 ppm and which has a structure of the core and its coating obtainable by fluidized-bed spray granulation, characterised by a TAM value of less than 3 µW/g, measured after 48 hours at 40° C.

DETAILED DESCRIPTION OF THE PREFERRED EMBODIMENTS

According to EP patent 0 716 640 referred to at the beginning, the fluidized-bed spray granulation is carried out at a fluidized-bed temperature in the range from 40 to 95° C. and preferably from 50 to 70° C. That document also teaches that the sodium percarbonate fluidized-bed spray granulate, which has a moisture content of from 2 to 10 wt. %, is removed from the fluidized-bed apparatus and, as required, is dried or is subjected to after-treatment for the purpose of increasing its stability. The term "drying" is to be understood as meaning that no spray solution is injected into the fluidized bed during that time. There is no suggestion in that document that the drying should be carried out at a higher temperature. The coating of sodium percarbonate in a fluidized bed is such "after-treatment". There is thus no indication in that document to the person skilled in the art to dry the fluidized-bed spray granulate before it is coated; rather, the person skilled in the art would place a drying step at the end of the entire process, that is to say would carry out the drying after coating of the granulate in a fluidized bed. Surprisingly, it has now been found that the TAM value of coated granular sodium percarbonate can be substantially lowered if the granular sodium percarbonate obtained by fluidized-bed spray granulation is dried at a raised temperature before it is coated. By means of an additional drying step following coating it is possible to achieve a further reduction in the TAM value, a very brief drying period generally being sufficient in view of the small layer thickness of the coating.

The granulation step of the process according to the invention can be carried out in one or more steps. In the case of a single-step procedure, the reactants are injected into the fluidized bed while a fluidized-bed temperature $T_G$ in the range from 45 to 75° C., preferably from 55 to 75° C., is maintained, with the simultaneous evaporation of water. Injection can be carried out by means of one or more spray nozzles. The reactants are particularly preferably injected into the fluidized-bed reactor using a 3- or 4-component nozzle, for example according to EP 0 716 640 B1 or EP 0 787 682. There are suitable for the preparation of the uncoated granular sodium percarbonate conventional fluidized-bed reactors with or without grading discharge of the granulate. According to a preferred embodiment, the reactor is a flow trough which can be divided into a plurality of chambers and on the side walls of which are arranged the nozzles.

According to a first embodiment of the process according to the invention, in which the fluidized-bed spray granulation is carried out with the maintenance of substantially a fluidized-bed temperature, the granulation step (i) is followed by drying at a temperature $T_{NT}$ which is higher than $T_G$, during which no further reactants in the form of an aqueous solution are injected. During the drying, the TAM value falls. The drying is preferably carried out at a fluidized-bed temperature $T_{NT}$ in the range from greater than 75° C. to 95° C., especially 90±5° C. $T_{NT}$ is preferably from 10 to 30° C., especially from 20 to 30° C., higher than $T_G$.

Drying in that manner leads to a greater reduction in the TAM value than does simple drying of the coated granular sodium percarbonate. According to an alternative embodiment of the process according to the invention, step (i) is carried out not at a substantially constant temperature $T_G$ but in two or more steps with an increasing fluidized-bed temperature $T_{G1}$, $T_{G2}$ ... $T_{Gn}$, $T_{Gn}$ being higher than $T_{G1}$. The temperature difference between $T_{G1}$ and $T_{Gn}$ is advantageously from 10 to 40° C., especially from 20 to 30° C. The preparation of the fluidized-bed spray granulate is carried out particularly preferably in two steps at a fluidized-bed temperature $T_{G1}$ of 70 ±5° C. and a fluidized-bed temperature $T_{G2}$ (=$T_{Gn}$) of 90±5° C. The second step takes place when at least half of the granulate has been formed. Advantageously, at least ⅔ of the mass of the granulate are produced in the course of a first step and less than ⅓ of the mass is produced in a second or further step(s). It has been found that the active oxygen loss is lower in that embodiment than when the granulate formation takes place from the outset at a higher fluidized-bed temperature. At the same time, the embodiment according to the invention yields granulates having a lower TAM value. The granulate obtained by two- or multi-step fluidized-bed spray granulation can, if required, also be dried at a temperature $T_{NT}$, $T_{NT}$ being equal to or higher than the last temperature stage of the fluidized-bed spray granulation; accordingly, in the case of two-step fluidized-bed spray granulation, $T_{NT}$ is equal to or higher than $T_{G2}$ or $T_{Gn}$.

The duration of the drying in the case of single-step and, as required, also multi-step spray granulation is dependent on the desired residual moisture content and, especially, on the desired lowering of the TAM value. The drying time is usually in the range from 1 to 60 minutes, preferably in the range from 15 to 45 minutes and particularly preferably 30 minutes. The optimum drying time, which is also dependent on the operating parameters of the fluidized-bed reactor, can readily be determined by means of some orienting preliminary tests.

Coating of the fluidized-bed spray granulate was usually carried out at a fluidized-bed temperature $T_U$ in the range from 35 to 100° C., especially from 40 to 90° C. and particularly preferably from 40 to 70° C. Coating can be carried out in one or more steps, an aqueous solution containing one or more coating components in each case being applied by spraying to the previously formed sodium percarbonate fluidized-bed granulate, with simultaneous evaporation of the water that has been introduced. The coating components are hydrate-forming inorganic salts, such as magnesium sulfate, sodium sulfate, soda and sodium bicarbonate and combinations of salts; borates and chelating agents are also suitable coating components. According to a preferred embodiment, the coated granular sodium percarbonate contains up to 10 wt. % coating component(s), preferably about 5 wt. %.

Where desirable in view of a further reduction in the TAM value, it is advantageous to dry the coated fluidized-bed spray granulate at a fluidized-bed temperature $T_{UNT}$. The temperature $T_{UNT}$ is usually equal to or higher than $T_U$ and higher than $T_G$. Since the layer thickness of the coating is generally very small, it is sufficient to dry the coated material for only a few minutes, for example from 2 to 10 minutes, if the core has already been dried in accordance with the invention. If $T_U$ is already considerably higher than $T_G$ or $T_{Gn}$, for example from 10 to 30° C. higher, it is possible to dispense with drying.

In accordance with a further embodiment according to the invention, preparation of the granulate is immediately followed by coating thereof with a coating material, the fluidized-bed temperature being $T_G$ during preparation of the granulate and $T_U$ during coating. In that embodiment, the coated granular sodium percarbonate is dried at a fluidized-bed temperature $T_{UNT}$ that is at least 10° C., preferably from 20 to 30° C., higher than the temperature $T_G$ or $T_{Gn}$. In that embodiment, the drying time is generally from 10 to 60 minutes.

The hydrogen peroxide solution used in the preparation of the granulate, and the aqueous soda solution or suspension, can contain conventional stabilizers. In particular, the soda solution or suspension contains sodium silicate and the aqueous hydrogen peroxide solution contains a magnesium salt and, optionally, further stabilizers. The hydrogen peroxide solution particularly preferably contains a magnesium salt in such an amount that the coated sodium percarbonate contains from 100 to 1000 ppm $Mg^{2+}$. It has been found that it is possible by adding a magnesium salt to lower the TAM value considerably—see DE patent application 100 48 514.6.

By means of the process according to the invention it is possible to obtain coated granular sodium percarbonate having a very low TAM value. As will be seen from the Examples, it is even possible to make available coated sodium percarbonate having a TAM value below 3 μW/g. Such low TAM values were not obtainable by the prior-known processes.

of a three-component atomizer nozzle into a starting fluidized bed of soda cores (instead of sodium percarbonate) having a small particle diameter. Heated fluidizing air (about 200° C.) was drawn in by way of a fan (about 160 Nm³/h). Spraying was continued until a mean particle diameter of 500 μm had been reached. The soda content from the starting fluidized bed in the fluidized-bed spray granulate was less than 10%. The amount of product in the fluidized bed was kept approximately constant at 5 kg during the test by the periodic removal of a portion. The throughput of the starting materials corresponded to 5 kg of sodium percarbonate. Soda was used in the form of a 30 wt. % aqueous solution containing sodium silicate as stabilizer, and hydrogen peroxide was used in the form of a 43.5 wt. % aqueous solution. Where $Mg^{2+}$ was used as stabilizer, it was added in the form of $MgSO_4 \cdot 7H_2O$ to the $H_2O_2$ solution. The molar ratio of soda to $H_2O_2$ was set at 1:1.58.

Where the granulate was dried before being coated, the drying takes place in the fluidized-bed granulator.

Once the target particle size had been reached in the fluidized-bed spray granulation, the granulate, without or after being dried, was coated with 5% sodium sulfate in a further fluidized-bed spray reactor and dried as indicated.

The fluidized-bed temperatures, active oxygen contents $O_a$, TAM values (determined at 40° C. and 48 h) and particulars will be found in the following Table 1. $T_G$ stands for the fluidized-bed temperature during formation of the granulate, $T_U$ stands for the fluidized-bed temperature during coating, $T_{NT}$ stands for the fluidized-bed temperature during drying of the granulate prior to coating, $T_{Gn}$ stands for the fluidized-bed temperature for the second granulation step, $T_{UNT}$ stands for the fluidized-bed temperature during drying of the coated granulate.

TABLE 1

| Example No. | Fluidized-bed temperature ° C. | | | | Oa (%) | TAM (μW/g) | Remarks |
| | $T_G$[1] | $T_{NT}$[2] | $T_U$* | $T_{UNT}$[3] | | | |
|---|---|---|---|---|---|---|---|
| 1 | 68–70 | — | 70 =>60 | 68–70 | 13.1 | 11.3 | n.i. |
| 2 | 88–90 | — | 70 =>60 | 68–70 | 12.5 | 6.8 | n.i. |
| 3 | 68–70 | 88–90 | 70 =>60 | — | 12.8 | 6.4 | i. |
| 4 | 68–70 | 88–90 | 70 =>60 | 88–90 | 12.8 | 4.8 | i. |
| 5 | 68–70 | — | 70 =>60 | 68–70 | 13.1 | 5.1 | n.i.; Mg-stab. |
| 6 | 68–70 | — | 70 =>60 | 88–90 | 13.1 | 3.6 | i.; Mg-stab |
| 7 | 68–70 | 88–90 | 70 =>60 | — | 12.8 | 3.6 | i.; Mg-stab |
| 8 | | 88–90 | 70 =>60 | 88–90 | 12.8 | 2.9 | i.; Mg-stab |

[1]Granulation time: about 3 h
[2]Drying time of the granulate: about 0.5 h
[3]Drying time of the coated granulate: 0.5 h
i. in accordance with the invention
n.i. not in accordance with the invention
Mg-stab. stabilised with 1000 ppm $Mg^{2+}$
*)Starting temperature 70° C. / Temperature during coating about 60° C.

The process according to the invention and the products obtained thereby are illustrated by means of the following Examples.

EXAMPLES

General description of the fluidized-bed spray granulation and coating as well as drying.

The fluidized-bed spray granulation (step i) was carried out according to EP 0 716 640 B1 in a laboratory fluidized-bed granulator. The reactants, that is to say the soda solution and the hydrogen peroxide solution, were sprayed by means Examples 1 and 2, which are not in accordance with the invention, show that although the TAM value is lowered by increasing the fluidized-bed temperature $T_G$, there is a simultaneous considerable fall in the active oxygen content (Oa). As will be seen from a comparison with Examples 3 and 4, the fall in Oa can be kept within narrower limits when the process is carried out in accordance with the invention; in addition, the TAM value is lowered further when the granulate is dried before being coated, with $T_{NT}$ being higher than $T_G$—see Example 3. A further reduction in the TAM value is achieved by additional drying of the coated granulate, when $T_{UNT}$ is higher than $T_U$—see Example 4. The TAM value is lowered further by stabilizing the core of the sodium percarbonate granulate with magnesium—see Examples 5 to 8. In this case, too, there is a further lowering of the TAM value when drying is carried out at a higher temperature after formation of the granulate, that is to say before the coating, and/or after the coating—$T_{NT}$ and $T_{UNT}$ are higher than $T_G$ and $T_U$.

Example 9

In this case, the granulation was carried out in two steps, with 5/6 of the granulate formation taking place at $T_G$ and 1/6 at $T_{GNT}$, $T_{GNT}$ being higher than $T_G$. By means of that increase in temperature, a drying effect is achieved with simultaneous further washing of the granulate core, the TAM value being lowered without a great loss of active oxygen. Further drying at $T_{NT}$, where $T_{NT} > T_G$, led to a further lowering of the TAM value. Table 2 shows the results. The products according to 9.2 and 9.3 were coated in a known manner with 5% $Na_2SO_4$, but the data in Table 2 relate to uncoated granulate without Mg stabilisation.

| Example No. | Granulation time (min) | Fluidized-bed temperature (° C.) | | | Oa (%) | TAM (μW/g) |
| --- | --- | --- | --- | --- | --- | --- |
| | | $T_G$ | $T_{GNT}$ | $T_{NT}$ | | |
| 9.1 | 150 | 70 | — | — | 13.5 | 9.1 |
| 9.2 | 30 | — | 90 | — | 13.6 | 6.2 |
| 9.3 | 30 | — | — | 90 | 13.4 | 5.1 |

Obviously, numerous modifications and variations of the present invention are possible in light of the above teachings. It is therefore to be understood that within the scope of the appended claims, the invention may be practiced otherwise than as specifically described herein.

Each document, patent application or patent publication cited by or referred to in this disclosure is incorporated by reference in its entirety. Any patent document to which this application claims priority is also incorporated by reference in its entirety. Specifically, priority document DE 101 40 838.2 filed Aug. 21, 2001 is hereby incorporated by reference.

We claim:

1. A process for the preparation of a coated granular sodium percarbonate, comprising:
   (i) preparing granular sodium percarbonate by fluidized-bed spray granulation, wherein an aqueous sodium carbonate solution or suspension and an aqueous hydrogen peroxide solution are sprayed in a molar ratio of $Na_2CO_3$ to $H_2O_2$ in the range from 1:1.4 to 1:1.8 into a fluidized-bed comprising sodium percarbonate particles, at a fluidized-bed temperature $T_G$ in the range of from 45 to 75° C., and water is simultaneously evaporated off;
   (ii) coating said granular sodium percarbonate by spray application, in a fluidised bed, of at least one aqueous solution comprising one or more coating components, with the simultaneous evaporation of water; and
   (iii) drying said granular sodium percarbonate at a fluidized-bed temperature $T_{NT}$ in the range from greater than 75 to 95° C. that is higher than said fluidized-bed temperature $T_G$, wherein said drying is carried out before the coating, or both before and after the coating.

2. The process as claimed in claim 1, wherein said coating is carried out at a fluidized-bed temperature $T_U$ in the range from 35 to 100° C.

3. The process as claimed in claim 1, wherein said fluidized-bed spray granulation is carried out in two fluidized-bed spray granulation steps, wherein a first fluidized-bed spray granulation step is carried out at said fluidized-bed temperature $T_G$, a second fluidized-bed spray granulation step is carried out at a fluidized-bed temperature $T_{GNT}$, and said fluidized-bed temperature $T_{GNT}$ is higher than said fluidized-bed temperature $T_G$.

4. The process as claimed in claim 3, wherein at least 5/6 of said granular sodium percarbonate is formed in said first fluidized-bed spray granulation step.

5. The process as claimed in claim 1, wherein said fluidized-bed spray granulation is carried out in at least two fluidized-bed spray granulation steps, wherein a first fluidized-bed spray granulation step is carried out at a fluidized-bed temperature $T_{G1}$ and one or more additional fluidized-bed spray granulation steps are carried out at fluidized-bed temperatures $T_{Gn}$, wherein n is the number of said additional fluidized-bed spray granulation steps, and wherein said fluidized-bed temperatures $T_{Gn}$ are higher than said fluidized-bed temperature $T_{G1}$.

6. The process as claimed in claim 5, wherein at least two thirds of said granular sodium percarbonate by mass is formed during a first fluidized-bed spray granulation step.

7. The process as claimed in claim 1, wherein said fluidized-bed temperature $T_G$ is in the range of 55 to 75° C.

8. The process as claimed in claim 1, wherein said granular percarbonate is dried with a dwell time of from 15 to 45 minutes.

9. The process as claimed in claim 1, wherein the aqueous sodium carbonate solution or suspension and the aqueous hydrogen peroxide solution are sprayed in a molar ratio of $Na_2CO_3$ and $H_2O_2$ in the range of 1:1.5 to 1:1.6.

10. The process as claimed in claim 1, wherein said fluidized-bed spray granulation and said drying are carried out in a flow trough which is divided into a plurality of chambers.

11. The process as claimed in claim 10, wherein said coating and said drying of a coated granular sodium percarbonate are carried out in one or more downstream chambers of said flow trough or in a separate fluidised-bed reactor arranged downstream of said flow trough.

12. The process as claimed in claim 1, wherein said granular sodium percarbonate, after drying, is coated with one or more layers of a coating material containing sodium sulfate to produce a coating on said granular sodium percarbonate, wherein said coating comprises an outermost coating layer containing sodium sulfate as principal component and a total amount of coating material of less than 10 wt. %, based on said coated granular sodium percarbonate.

13. A process for the preparation of a coated granular sodium percarbonate, comprising:
   (i) preparing granular sodium percarbonate by fluidized-bed spray granulation, wherein an aqueous sodium carbonate solution or suspension and an aqueous hydrogen peroxide solution are sprayed in a molar ratio of $Na_2CO_3$ to $H_2O_2$ in the range from 1:1.4 to 1:1.8 into a fluidized-bed comprising sodium percarbonate particles, at a fluidized-bed temperature $T_G$ in the range of from 45 to 75° C., and water is simultaneously evaporated off;
   (ii) coating said granular sodium percarbonate by spray application, in a fluidised bed, of at least one aqueous solution comprising one or more coating components, with the simultaneous evaporation of water; and (iii) drying said granular sodium percarbonate at a fluidized-bed temperature $T_{NT}$ in the range from greater than 75 to 95° C. that is higher than said fluidized-bed temperature $T_G$, wherein said drying is carried out before coating, or both before and after coating, wherein said fluidized-bed temperature $T_{NT}$ is from 10 to 30° C. greater than $T_G$.

14. The process as claimed in claim 13, wherein said coating is carried out at a fluidized-bed temperature $T_U$ in the range from 35 to 100° C.

15. The process as claimed in claim 14, wherein said fluidized-bed temperature $T_U$ is in the range from 40 to 90° C.

16. The process as claimed in claim 13, wherein said fluidized-bed spray granulation is carried out in at least two fluidized-bed spray granulation steps, wherein a first fluidized-bed spray granulation step is carried out at a fluidized-bed temperature $T_{G1}$, and one or more additional fluidized-bed spray granulation steps are carried out at fluidized-bed temperatures $T_{Gn}$, wherein n is the number of said additional fluidized-bed spray granulation steps, and wherein said fluidized-bed temperatures $T_{Gn}$ are higher than said fluidized-bed temperature $T_{G1}$, and at least two thirds of said granular sodium percarbonate by mass is formed during a first fluidized-bed spray granulation step.

17. The process as claimed in claim 13, wherein said fluidized-bed temperature $T_G$ is in the range of 55 to 75° C.

18. The process as claimed in claim 13, wherein said granular percarbonate is dried with a dwell time of from 15 to 45 minutes.

19. A process for the preparation of a coated granular sodium percarbonate, comprising:

(i) preparing granular sodium percarbonate by fluidized-bed spray granulation, wherein an aqueous sodium carbonate solution or suspension and an aqueous hydrogen peroxide solution are sprayed in a molar ratio of $Na_2CO_3$ to $H_2O_2$ in the range from 1:1.4 to 1:1.8 into a fluidized-bed comprising sodium percarbonate particles, at a fluidized-bed temperature $T_G$ in the range of from 45 to 75° C., and water is simultaneously evaporated off;

(ii) coating said granular sodium percarbonate by spray application, in a fluidised bed, of at least one aqueous solution comprising one or more coating components, with the simultaneous evaporation of water; and (iii) drying said granular sodium percarbonate at a fluidized-bed temperature $T_{NT}$ in the range from greater than 75 to 95° C. that is higher than said fluidized-bed temperature $T_G$, wherein said drying is carried out before coating, or both before and after coating, wherein said aqueous hydrogen peroxide solution comprises a magnesium salt in an amount equivalent to 100 to 1000 ppm $Mg_{2+}$ in said coated granular sodium percarbonate.

20. The process as claimed in claim 19, wherein said coating is carried out at a fluidized-bed temperature $T_U$ in the range from 35 to 100° C.

21. The process as claimed in claim 20, wherein said fluidized-bed temperature $T_U$ is in the range from 40 to 90° C.

22. The process as claimed in claim 19, wherein said fluidized-bed spray granulation is carried out in at least two fluidized-bed spray granulation steps, wherein a first fluidized-bed spray granulation step is carried out at a fluidized-bed temperature $T_{G1}$, and one or more additional fluidized-bed spray granulation steps are carried out at fluidized-bed temperatures $T_{Gn}$, wherein n is the number of said additional fluidized-bed spray granulation steps temperatures $T_{Gn}$ are higher than said fluidized-bed temperature $T_{G1}$, and at least two thirds of said granular sodium percarbonate by mass is formed during a first fluidized-bed spray granulation step.

23. The process as claimed in claim 19, wherein said fluidized-bed temperature $T_G$ is in the range of 55 to 75° C.

24. The process as claimed in claim 19, wherein said granular percarbonate is dried with a dwell time of from 15 to 45 minutes.

* * * * *